Patented Jan. 21, 1930

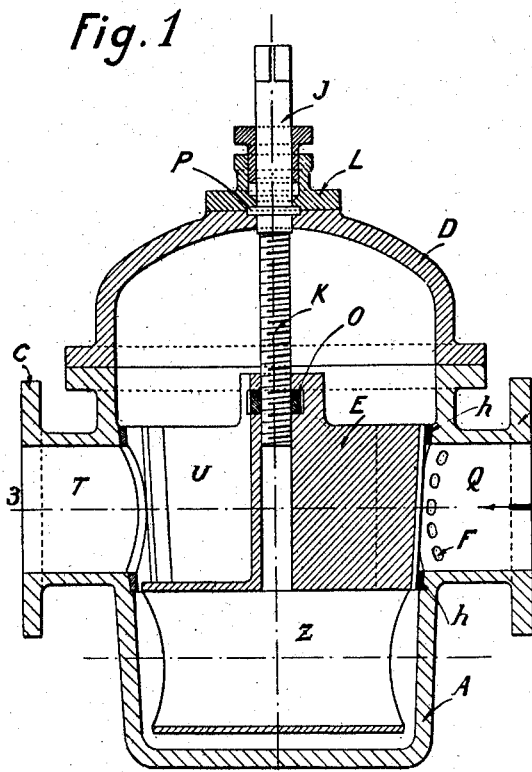
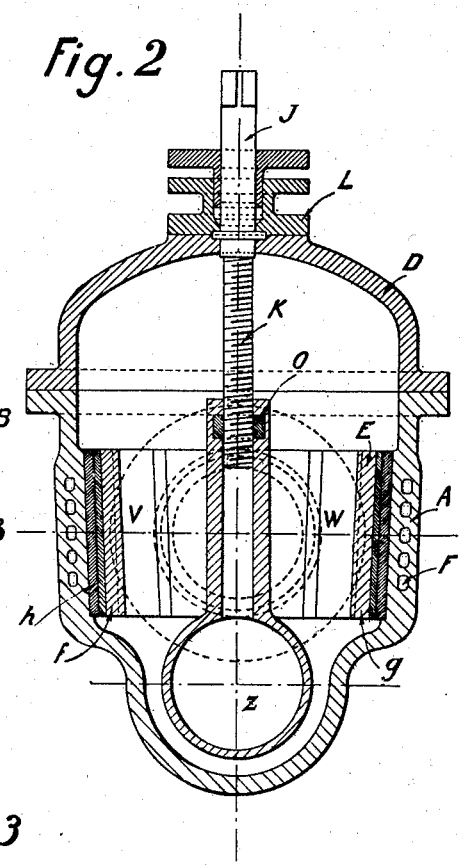
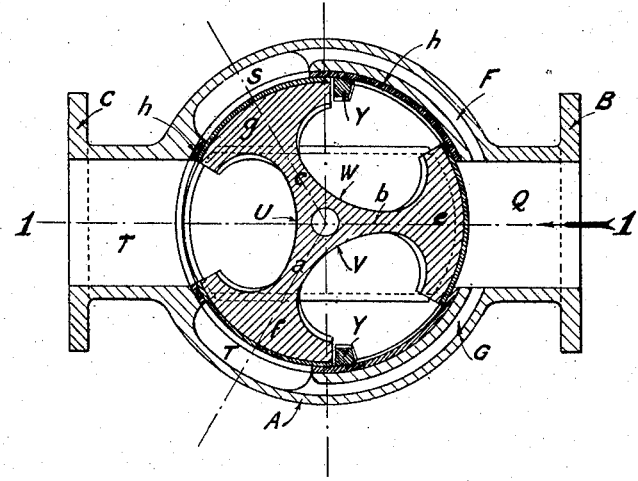

1,744,221

UNITED STATES PATENT OFFICE

GABRIEL GOMAND, OF BARCELONA, SPAIN

VALVE

Application filed November 5, 1928, Serial No. 317,282, and in France December 13, 1927.

This invention relates to improvements in valves of the sluice valve type. One object of the invention is to provide a balanced sluice valve which, although having but a single axially movable obturating element, is capable of establishing a straight through passage between the ports. Another object of the invention is to provide a balanced sluice valve in which all the pressure effects, both horizontal and vertical, are exactly balanced and are maintained balanced without it being necessary to keep the regulating means in perfect condition and without requiring auxiliary mechanical gear. A further object is to provide a fully balanced sluice valve of extremely simple construction.

One manner of carrying the invention into effect is illustrated by way of example in the annexed drawings.

Figure 1 is a vertical axial section on the line I—I Figure 3.

Figure 2 is a vertical axial section in a plane at right angles to the plane of section in Figure 1, and Figure 3 is a transverse section taken on III—III of Figure 1.

As may be seen from the drawings the principal or operative part E of the valve is a member having three arms $a$, $b$, $c$. At the extremity of each of these arms there is a sector $e$, $f$ or $g$, the said sectors having surfaces forming part of a truncated cone which, if complete, would have an acute apex angle.

This member E may be moved in the interior of a body consisting of a casing part A carrying two flanges enabling it to be arranged in the pipe line; these flanges are indicated by B' and C. Said part A has conical seating surfaces $h$ with which the seating surfaces $e$, $f$, $g$ of the body of the valve are adapted to fit.

The valve casing is closed by a cover D through which, by way of a stuffing box L, passes an operating rod J. At its lower part K said rod is screw threaded and a collar P prevents it becoming displaced in a vertical direction. The threaded part of said rod engages an imprisoned nut O which is rigid with the valve body E. Said body E cannot turn owing to the guide projections Y provided in the housing A.

It will be readily understood that if the rod J is rotated, then the nut O and with it the valve body E will rise or descend in the housing A, thus bringing about the opening and closing of the valve.

The stuffing box L, being of well known construction, need not be described in detail.

To balance the pressures on the inlet and outlet sides of the valve body E whether it is in its open or closed position, passages F, G starting from one of the connections with the pipe line are pierced through the periphery of the housing A. These passages terminate in segmental chambers $s$, $t$ disposed at 120° in relation to the connection Q in such a fashion as to be located opposite the surfaces $f$, $g$ of the valve body E. The whole is designed in such a manner that the surfaces exposed to pressure in the chambers $s$ and $t$ and the surface exposed in the connection Q are all of equal area. It will be seen immediately that these three pressures will balance; three equal surfaces arranged at 120° and subject to the same pressure giving a resultant of zero value.

To balance pressure originating from the connection T, identical cavities disposed at 120° to one another and inter-communicating by the spaces above and below the valve body E are provided between the arms $a$, $b$, $c$. In this fashion, pressure in the connection T is exerted not only in the interior of the cavity U but also in the interiors of the cavities V and W, which are identical therewith and of which the planes of symmetry are located at 120° to that of said cavity U.

Similar reasoning to that which has been used above shows that the resultant forces from these various pressures balance one another so that the valve is horizontally balanced when pressure is admitted at T just the same as it is balanced when the pressure is admitted at Q.

In so far as the vertical pressures are concerned, these are different depending upon whether the valve is open or closed, that is to say whether the valve body is immersed or not. If the valve body is not immersed, then the only vertical pressure which it experiences arises of necessity when pressure is admitted by the connection T. This pressure will be due to the conical shape of the bearing surfaces $e, f, g$. The weight of the valve body E is designed in such a way as to balance such pressures.

If the valve is open, the valve body is immersed and the vertical force acting downwardly from above will be equal to the weight of the valve body and the operating rod, less the Archimedean thrust upon these members. In this case the action of the pressure on the lower part of the operating rod, which alone need be considered, enables a force to be obtained which is precisely equal to the above but acting in the opposite direction. Consequently the valve is balanced in this case also. The same state of affairs is produced when the valve is closed and the pressure is acting from the connection T.

Provision for a straight through passage when the valve is open enabling loss of head or pressure to be avoided, is particularly simple with the arrangement described, as the balancing means do not necessitate or include any obstacle in the direct line between the connections. To reduce or eliminate loss of lead in the fully open position of the valve, the valve body E is provided with a passage Z which has the same diameter as the pipe line and the inlet connection pieces Q, T, and is adapted by the manipulation of the same operating means J, K, O to be brought into alignment with said connections. Thus when the valve is fully open, it only offers to the passage of the fluid the same resistance as a pipe of the same length and diameter as the valve.

Since the tightness and balancing are assured, no matter from which side the pressure may act, the valve may be mounted in any direction and, what is important, may be used in conduits which are traversed by a flow which is at one time in one direction and at another time in the opposite direction.

It should be remarked also that as the valve is balanced equally well in the vertical direction as in the horizontal direction, the vertical pressure on the shoulder P is always zero so that it will not be necessary to furnish this shoulder with a ball bearing. From the above, moreover, it will be appreciated that all the pressure effects, both horizontal and vertical, are balanced and are maintained balanced without it being necessary to keep the regulating means in perfect condition and without requiring auxiliary mechanical gear. Moreover, although balanced, said sluice valve is of extremely simple construction.

I claim:—

1. Sluice valve comprising a valve housing with oppositely disposed ports and a single obturating element axially movable to open or close a straight through passage between said ports and provided with two sets of balancing surfaces exposed respectively to the fluid pressures on each side of the valve.

2. Balanced sluice valve comprising a valve housing with oppositely disposed ports and connections and a single obturating element consisting of an inverted conical plug axially movable to open or close an unobstructed straight passage between the ports and two sets of peripheral balancing surfaces exposed respectively to the fluid pressures on the inlet and outlet sides of the valve.

3. Balanced sluice valve comprising a valve housing with diametrically opposed ports, a cone valve movable axially to open or close a straight through passage between said ports and composed of three conical segments disposed 120° apart and alternated with three intercommunicating cavities, two chambers located in the housing and communicating with one of the ports being opposed to two of the segments while the two ports are opposed by the third segment and one of said cavities respectively 4. Balanced sluice valve comprising a valve housing with oppositely disposed ports, a single valve body axially movable to open or close a straight through passage between the ports, two sets of balancing surfaces on said valve body exposed respectively to the pressures on each side of the valve and a tubular full bore duct mounted on the valve body and adapted to bound the straight through passage when the valve is fully open.

5. Balanced sluice valve comprising a valve housing with opposed ports, a single conical obturating element, operating means including a rod for moving said element axially to control a straight through passage between the ports and sets of balancing surfaces exposed respectively to the pressures on each side of the valve, the conicity and weight of the valve and dimensions of the operating rod being designed to ensure vertical balance of the valve body under all conditions substantially as set forth.

In testimony that I claim the foregoing as my invention, I have signed my name.

GABRIEL GOMAND.